US012567426B2

(12) United States Patent
Fejzo et al.

(10) Patent No.: US 12,567,426 B2
(45) Date of Patent: Mar. 3, 2026

(54) MACHINE LEARNING-BASED KEY GENERATION FOR KEY-GUIDED AUDIO SIGNAL TRANSFORMATION

(71) Applicant: DTS, Inc., Calabasas, CA (US)

(72) Inventors: Zoran Fejzo, Calabasas, CA (US);
Antonius Kalker, Calabasas, CA (US);
Atti Venkatraman, Calabasas, CA (US)

(73) Assignee: DTS, Inc., Calabasas, CA (US)

( * ) Notice: Subject to any disclaimer, the term of this patent is extended or adjusted under 35 U.S.C. 154(b) by 400 days.

(21) Appl. No.: 18/104,047

(22) Filed: Jan. 31, 2023

(65) Prior Publication Data

US 2023/0186926 A1     Jun. 15, 2023

Related U.S. Application Data

(63) Continuation of application No. PCT/US2020/044518, filed on Jul. 31, 2020.

(51) Int. Cl.
*G10L 19/02*          (2013.01)
*G06N 3/045*          (2023.01)
*G10L 25/30*          (2013.01)

(52) U.S. Cl.
CPC .......... *G10L 19/0212* (2013.01); *G06N 3/045* (2023.01); *G10L 25/30* (2013.01)

(58) Field of Classification Search
CPC ... G10L 19/0212; G10L 25/30; G10L 21/003; G10L 21/0316; G10L 21/038; G10L 19/04; G06N 3/045; G06N 3/044; G06N 3/084
See application file for complete search history.

(56) References Cited

U.S. PATENT DOCUMENTS

| | | | |
|---|---|---|---|
| 2019/0341067 A1 | 11/2019 | Rajendran et al. | |
| 2021/0074308 A1* | 3/2021 | Skordilis | G10L 19/13 |
| 2022/0148582 A1* | 5/2022 | Li | G10L 21/0224 |
| 2023/0089393 A1* | 3/2023 | O'Shea | G06N 3/088 |
| | | | 375/267 |

FOREIGN PATENT DOCUMENTS

| | | |
|---|---|---|
| CN | 110136690 | 8/2019 |

OTHER PUBLICATIONS

International Search Report and Written Opinion in counterpart International Application No. PCT/US2020/044518, mailed Apr. 6, 2021, 19 pages.

(Continued)

*Primary Examiner* — Linda Wong
(74) *Attorney, Agent, or Firm* — Lerner David LLP

(57)          ABSTRACT

A method comprise: receiving input audio and target audio having a target audio characteristic; using a first neural network, trained to generate key parameters that represent the target audio characteristic based on one or more of the target audio and the input audio, generating the key parameters; and configuring a second neural network, trained to be configured by the key parameters, with the key parameters to cause the second neural network to perform a signal transformation of the input audio, to produce output audio having an output audio characteristic corresponding to and that matches the target audio characteristic.

17 Claims, 11 Drawing Sheets

400

(56) References Cited

OTHER PUBLICATIONS

Xuan Ji, et al., "Speaker-Aware Target Speaker Enhancement by Jointly Learning with Speaker Embedding Extraction," IEEE Xplor, ICASSP 2020—2020 IEEE International Conference on Acoustics, Speech and Signal Processing (ICASSP), May 4, 2020.

Konstantin Schmidt, et al., "Blind Bandwidth Extension of Speech based on LPCNet," 28th European Signal Processing Conference (EUSIPCO), Jan. 18, 2020, 5 pages.

W. Bastiaan Kleijn, et al., "Wavenet Based Low Rate Speech Coding," 2018 IEEE International Conference on Acoustics, Speech and Signal Processing (ICASSP), Apr. 15, 2018, 5 pages.

Milos Cernak, et al., "Composition of Deep and Spiking Neural Networks of Very Low Bit rate Speech Coding," ARXIV.Org, Cornell University Library, Apr. 15, 2016, 10 pages.

Lin Jiang, et al., "Low Bitrates Audio Bandwidth Extension Using a Deep Auto-Encoder," ICIAP: International Conference on Image Analysis and Processing, 17th International Conference, Nov. 22, 2015, 10 pages.

Qingbo Huang, et al., "A Parametric Spatial Audio Coding method based on Convolutional Neural Networks," Audio Engineering Society, Convention Paper 10126, Oct. 17-20, 2018, 7 pages.

Liqiang Zhang, "Learning Singing from Speech," ARXIV.Org, Cornell University Library, Dec. 20, 2019, 5 pages.

Ju-Chieh Chou, et al., "Multi-Target Voice Conversion without Parallel Data by Adversarially Learning Disentangled Audio Representations," ARXIV.Org, Cornell University Library, Apr. 9, 2018 5 pages.

Aaron van den Oord, et al., "WaveNet: A Generative Model for Raw Audio," ARXIV.Org, 4609.03499, https://arxiv.org/abs/1609.03499, Sep. 19, 2016, 15 pages.

David Ha., et al., "HyperNetworks," ARXIV.Org, 1609.09106, https://arxiv.org/abs/1609.09106, Dec. 1, 2016, 29 pages.

Ethan Perez, et al., "FiLM: Visual Reasoning with a General Conditioning Layer," ARXIV.Org, 1709.07871, https://arxiv.org/abs/1709.07871, Dec. 18, 2017, 13 pages.

Ashish Vaswani, et al., "Attention Is All You Need," ARXIV.Org, 1706.03762, https://arxiv.org/abs/1706.03762, Dec. 6, 2017, 15 pages.

* cited by examiner

FIRST TRAINING PROCESS (JOINT) - TRAINING ML MODELS

FIRST TRAINING PROCESS (JOINT) - KEY GENERATOR ML MODEL TRAINING

SECOND TRAINING PROCESS (FIRST-STAGE)

SECOND TRAINING PROCESS (SECOND-STAGE)

DECODED INPUT SIGNAL TRANSFORMATION
USING AUDIO SYNTHESIS ML MODEL INFERENCE

DECODED INPUT SIGNAL TRANSFORMATION
USING KEY GENERATOR ML MODEL INFERENCE AND
AUDIO SYNTHESIS ML MODEL INFERENCE

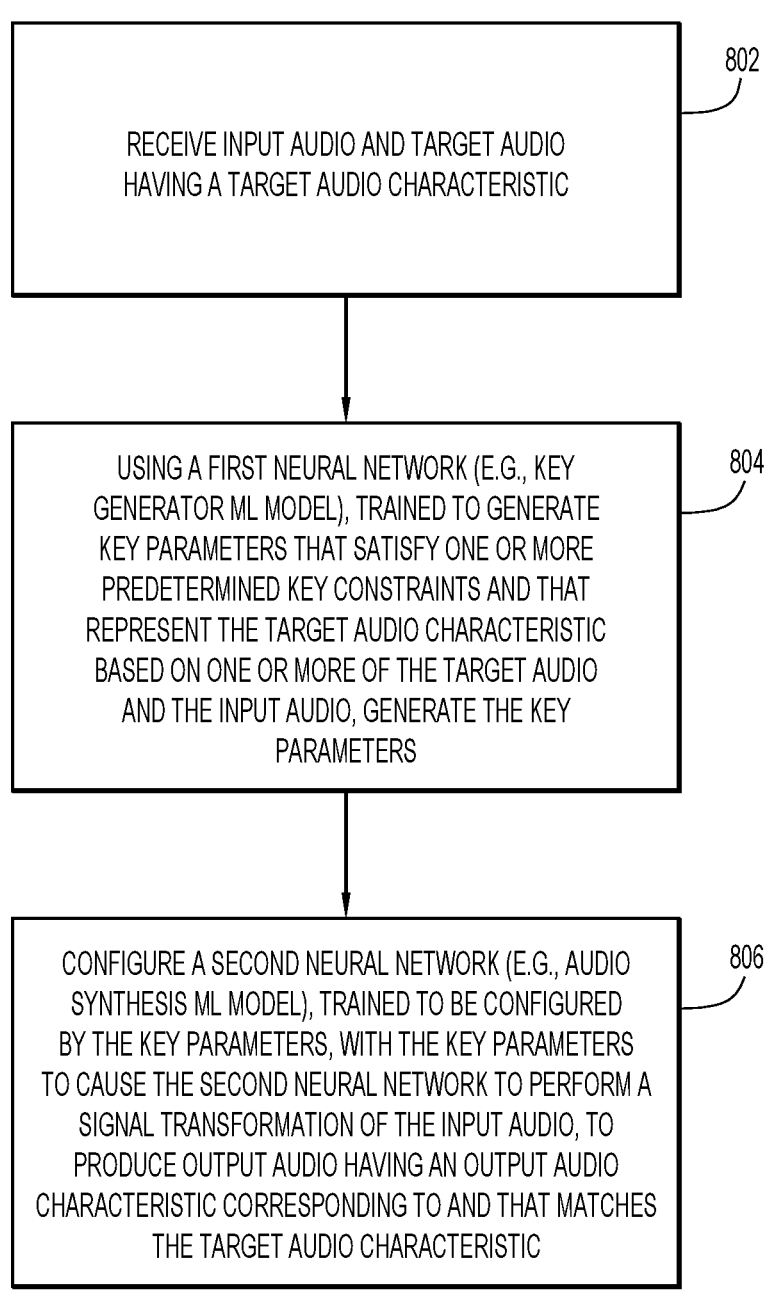

800

RECEIVE INPUT AUDIO AND TARGET AUDIO
HAVING A TARGET AUDIO CHARACTERISTIC

802

USING A FIRST NEURAL NETWORK (E.G., KEY
GENERATOR ML MODEL), TRAINED TO GENERATE
KEY PARAMETERS THAT SATISFY ONE OR MORE
PREDETERMINED KEY CONSTRAINTS AND THAT
REPRESENT THE TARGET AUDIO CHARACTERISTIC
BASED ON ONE OR MORE OF THE TARGET AUDIO
AND THE INPUT AUDIO, GENERATE THE KEY
PARAMETERS

804

CONFIGURE A SECOND NEURAL NETWORK (E.G., AUDIO
SYNTHESIS ML MODEL), TRAINED TO BE CONFIGURED
BY THE KEY PARAMETERS, WITH THE KEY PARAMETERS
TO CAUSE THE SECOND NEURAL NETWORK TO PERFORM A
SIGNAL TRANSFORMATION OF THE INPUT AUDIO, TO
PRODUCE OUTPUT AUDIO HAVING AN OUTPUT AUDIO
CHARACTERISTIC CORRESPONDING TO AND THAT MATCHES
THE TARGET AUDIO CHARACTERISTIC

MACHINE LEARNING-BASED KEY GENERATION FOR KEY-GUIDED AUDIO SIGNAL TRANSFORMATION

PRIORITY CLAIM

This application is a continuation of International Application No. PCT/US2020/044518, filed on Jul. 31, 2020, the entirety of which is incorporated herein by reference.

TECHNICAL FIELD

The present disclosure relates to performing machine learning (ML) key-guided signal transformations.

BACKGROUND

ML models of neural networks can model and learn a fixed signal transformation function. When there are multiple different signal transformations or in case of a continuously time-varying transformation, such static ML models tend to learn, for example, a suboptimal stochastically averaged transformation.

BRIEF DESCRIPTION OF THE DRAWINGS

FIG. 8 is a flowchart of an example method of performing key-guided signal transformation using the key generator ML model and the audio synthesis ML model, trained previously, to perform the signal transformation.

DESCRIPTION OF EXAMPLE EMBODIMENTS

Example Embodiments

Embodiments presented herein are directed to a machine learning (ML) approach or framework that jointly optimizes generation of a relatively small amount of metadata (e.g., key parameters), and synthesis of audio having desired audio characteristics based on the metadata. More specifically, a key generator ML model and an audio synthesis ML model are jointly trained for a specific/desired signal/audio transformation. During inference, the trained key generator ML model generates the key parameters, and the trained audio synthesis ML model transforms input audio to desired output audio based on the key parameters. In an embodiment in which the key parameters are transmitted from a remote transmission end to a local audio synthesis end, the key generator ML model has access to the input audio and target audio, which guide generation of the key parameters. In another embodiment in which the key parameters are not transmitted from the remote end to the local audio synthesis end, the key generator ML model operates locally and only has access to the input audio.

A non-limiting example of the signal transformation includes resolution enhancement of input audio in the form of pulse-code modulation (PCM)-based audio. In this example, given a low resolution/bandwidth representation and a high resolution/bandwidth representation of an audio signal, the key generator ML model generates a size-constrained set of metadata, e.g., key parameters, for guiding the audio synthesis ML model. Given the size-constrained set of metadata, e.g., key parameters, and the low resolution/bandwidth representation of the audio signal, the audio synthesis ML model synthesizes a high resolution/bandwidth representation of the audio signal.

In one embodiment, the two ML models (i.e., the key generator ML model and the audio synthesis ML model) may be trained jointly (i.e., concurrently and based on a total cost that combines individual costs associated with each of the ML models), and their respective trained instances (i.e., inferences) may be deployed in different environments. For example, the key generator ML model inference may be deployed in an HD radio transmitter while the audio synthesis ML model inference may be deployed in an HD radio receiver. In another embodiment, the ML models may be trained individually and sequentially, in which case their inference ML models may both be deployed in the HD radio receiver. In either deployment arrangement, the HD radio transmitter may transmit a rate reduced compressed audio signal, and the HD radio receiver may synthesize a higher resolution/bandwidth audio signal from the compressed audio signal based on the key parameters. This represents a form of audio super resolution.

Figure 1:
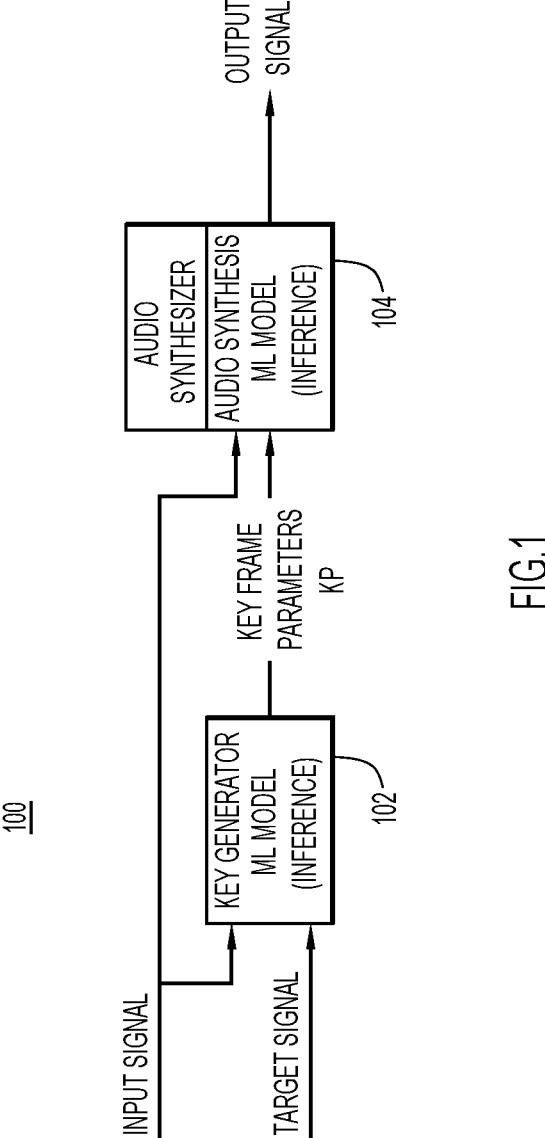
FIG. 1 is a high-level block diagram of an example system configured with a trained key generator ML model configured to generate key parameters during inference, and a trained audio synthesis ML model to perform dynamic key-guided signal transformations during inference based on the key parameters.

With reference to FIG. 1, there is a high-level block diagram of an example system 100 configured with previously trained ML models (also referred to as "neural network models" or simply "neural networks") to perform dynamic key-guided/key-based signal transformations. System 100 performs "inference-stage" processing because the processing is performed by the ML models after they have been trained. System 100 is presented as a construct useful for describing concepts employed in different embodiments presented below. As such, not all of the components and signals presented in system 100 apply to all of the different embodiments, as will be apparent from the ensuing description.

System 100 includes trained key generator ML model 102 (also referred to simply as "key generator 102") and a trained audio synthesis ML model 104 (also referred to as an "audio synthesizer 104") that may be deployed in a transmitter (TX)/receiver (RX) (TX/RX) system. In an example, key generator 102 receives key generation data that may include at least an input signal and/or a target or desired signal. Based on the key generation data, key generator 102 generates a set of transform parameters KP, also referred to as "key parameters" or "key frame parameters" KP. Key generator 102 may generate key parameters KP on a frame-by-frame basis, or over a group of frames, as described below. Key parameters KP parameterize or represent a desired/target signal characteristic of the target signal, such as a spectral/frequency-based characteristic or a temporal/time-based characteristic of the target signal, for example. In one embodiment of the TX/RX system, key generator 102 generates key parameters KP at transmitter TX and then transmits the key parameters KP to receiver RX along with the input signal. At receiver RX, audio synthesizer 104 receives the input signal and key parameters KP transmitted by transmitter TX. Audio synthesizer 104 performs a desired signal transformation of the input signal based on key parameters KP, to produce an output signal having an output signal characteristic similar to or that matches the desired/target signal characteristic of the target signal. In another embodiment of the TX/RX system, key generator 102 and audio synthesizer 104 both reside at the receiver RX.

Key generator 102 and audio synthesizer 104 include respective trained neural networks. Each neural network may be a convolutional neural network (CNN) that includes a series of neural network layers with convolutional filters having weights or coefficients that are configured based on a conventional stochastic gradient-based optimization algorithm. In another example, each neural network may be based on a recurrent neural network (RNN) model.

As mentioned above, key generator 102 is trained to generate key parameters KP. Audio synthesizer 104 is trained to be uniquely configured by key parameters KP to perform a dynamic key-guided signal transformation of the input signal, to produce the output signal, such that one or more output signal characteristics match or follow one or more desired/target signal characteristics. For example, key parameters KP configure the audio synthesizer ML model to perform the signal transformation such that spectral or temporal characteristics of the output signal match corresponding desired/target spectral or temporal characteristics of the target signal.

In an example in which the input signal and the target signal include respective sequences of signal frames, e.g., respective sequences of audio frames, key generator 102 generates key parameters KP on a frame-by-frame basis to produce a sequence of frame-by-frame key parameters, and audio synthesizer 104 is configured by the key parameters to perform the signal transformation of the input signal to the output signal on the frame-by-frame basis. That is, audio synthesizer 104 produces a uniquely transformed output frame for/corresponding to each given input frame, due to the frame-specific key parameters used to guide the transformation of the given input frame. Thus, as the desired/target signal characteristics dynamically vary from frame-to-frame and the generator key parameters that represent the desired/target signal characteristics correspondingly vary from fame-to-frame, the key-guided signal transformation will correspondingly vary frame-by-frame to cause the output frames have signal characteristics that track those of the target frames. In this way, key generator 102 and audio synthesizer 104 collectively implement/perform dynamic, key-guided signal transformations on the input signal, to produce the output signal that matches the target signal characteristics over time.

In various embodiments, the input signal may represent a pre-processed input signal that is representative of the input signal and the target signal may represent a pre-processed target signal that is representative of the target signal, such that key generator 102 generates key parameters KP based on the pre-processed input and target signals, and audio synthesizer 104 performs the signal transformation on the pre-processed input signal. In another embodiment, key parameters KP may represent encoded key parameters, such that the encoded key parameters configure audio synthesizer 104 to perform the signal transformation of the input signal or pre-processed input signal. Also, the input signal may represent an encoded input signal, or an encoded, pre-processed input signal, such that key generator 102 and audio synthesizer 104 each operate on the encoded input signal or the encoded pre-processed input signal. All of these and further variations are possible in various embodiments, some of which will be described below.

By way of example, various aspects of system 100, ML model inference processing, and training of the ML models, are now described in a context in which the input signal and the target signal are respective audio signals, i.e., "input audio" and "target audio." It is understood that the embodiments presented herein apply equally to other contexts, such as a context in which the input signal and the target signal include respective radio frequency (RF) signals, image, video, and so on. In the audio context, the target signal may be a speech or audio signal sampled at, e.g., 32 kHz, and buffered, e.g., as frames of 32 ms corresponding to 1024 samples per frame. Similarly, the input signal may be a speech or audio signal that is, for example:

a. Either sampled at the same sample rate as the target signal (e.g., 32 kHz) or sampled at a different sampling rate (e.g., 16 kHz, 44.1 kHz, or 48 kHz).

b. Buffered at either the same frame duration as the target signal (e.g., 32 ms) or a different duration (e.g., 16 ms, 20 ms, or 40 ms).

c. A bandlimited version of the target signal. For example, the target signal is a full-band audio signal including frequency content up to a Nyquist frequency, e.g., 16 kHz, while the input signal is bandlimited with audio frequency content that is less than that of the target signal, e.g., up to 4 kHz, 8 kHz, or 12 kHz.

d. A distorted version of the target signal. For example, the input signal contains unwanted noise or temporal/spectral distortions of the target signal.

e. Not perceptually or intelligibly related to the target signal. For example, the input signal includes speech/dialog, while target signal includes music; or the input signal includes music for instrument-1 while the target signal includes music from another instrument, and so on.

As mentioned above, the input signal and the target signal may each be pre-processed to produce a pre-processed input signal and a pre-processed target signal upon which key generator 102 and audio synthesizer 104 operate. Example pre-processing operations that may be performed on the input signal and the target signal include one or more of: resampling (e.g., down-sampling or up-sampling); direct current (DC) filtering to remove low frequencies, e.g., below 50 Hz; pre-emphasis filtering to compensate for a spectral tilt in the input signal; and/or adjusting gain such that the input signal is normalized before its subsequent signal transformation.

Figure 2A:
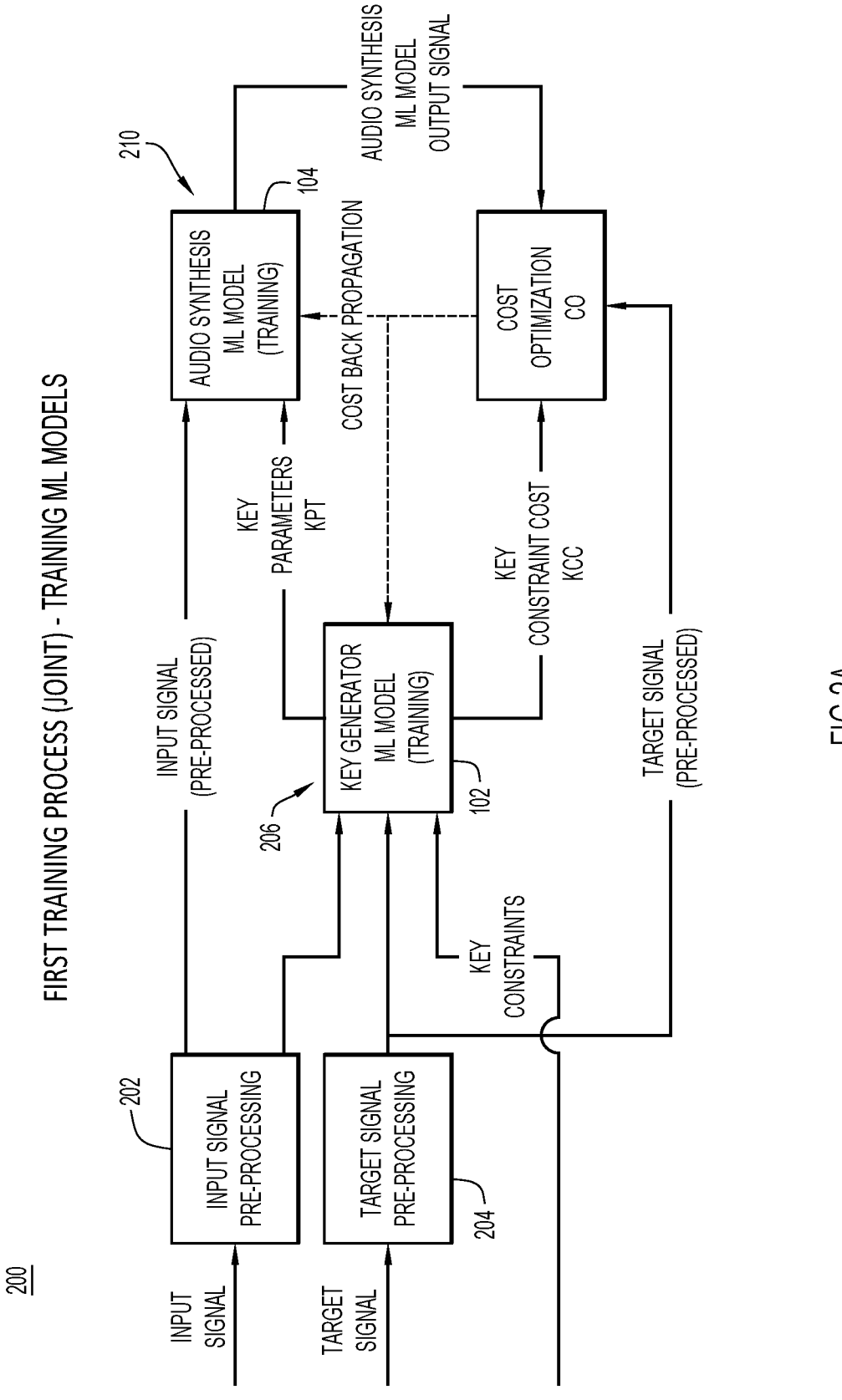
FIG. 2A is a flow diagram of an example first training process used to jointly train the key generator ML model and the audio synthesis ML model to perform a signal transformation.

The inference-stage processing described above in connection with FIG. 1 relies on key generator 102 and audio synthesizer 104 each being previously trained. Various training processes may be employed to train key generator 102 and audio synthesizer 104. A first training process that uses a first key cost implementation is now described in connection with FIGS. 2A and 2B. FIG. 2A is a flow diagram for the first training process. The first training process jointly trains key generator 102 and audio synthesizer 104 using various training signals. This means that key generator 102 and audio synthesizer are trained concurrently using a total cost that combines a first individual cost associated with the key generator/the key parameters and a second individual cost associated with the audio synthesizer/signal transformation, as will be described more fully below.

The training signals include a training input signal (e.g., training input audio), a training target signal (e.g., training target audio), and training key parameters KPT (generated by key generator 102 during training and used to train audio synthesizer 104) that have signal characteristics/properties generally similar to the input signal, the target signal, and key parameters KP used for inference-stage processing in system 100, for example; however, the training signals and the inference-stage signals are not the same signals. The training signals also including predetermined key constraints KC. Non-limiting examples of key constraints include a total number of bits allocated for transmission of key parameters in inference-stage processing (e.g., a length of vectors that represent the key parameters), and mutual orthogonality of the key parameters (e.g., the vectors). The first training process operates on a frame-by-frame basis, i.e., the training process operates on each frame of the input signal and corresponding concurrent frame of the target signal.

At 202, the training process pre-processes an input signal frame to produce a pre-processed input signal frame. Example input signal pre-processing operations include: resampling; DC filtering to remove low frequencies, e.g., below 50 Hz; pre-emphasis filtering to compensate for a spectral tilt in the input signal; and/or adjusting gain such that the input signal is normalized before a subsequent signal transformation. Similarly, at 204, the training process pre-processes the corresponding target signal frame, to produce a pre-processed target signal frame. The target signal pre-processing may perform all or a subset of the operations performed by the pre-processing of the input signal frame.

At 206, (initially untrained) key generator 102 generates a set of key parameters KPT corresponding to the input signal frame based on the key constraints and one or more of the input signal frame and the target signal frame. Also, key generator 102 uses/and or computes at least one key constraint cost KCC (i.e., a first cost) associated with key parameters KPT and used for training the key generator, i.e., that is to be minimized by the training.

At 210, (initially untrained) audio synthesizer 104 receives the pre-processed input signal frame and key parameters KPT for the input signal frame. Key parameters KPT configure audio synthesizer 104 to perform a signal transformation on the pre-processed input signal frame, to produce an output signal frame. In addition, a cost optimizer CO for implementing cost back propagation (CBP) receives the pre-processed target signal frame, the output signal frame, and key constraint cost KCC. Cost optimizer CO computes an audio synthesizer output cost/error for audio synthesizer 104, i.e., a second output cost associated with the signal transformation. Cost optimizer CO computes a final cost based on the audio synthesizer output cost and the key generator key constraint cost KCC, e.g., as a weighted combination of the two costs. The final cost drives back propagation of cost gradients (depicted in dashed-line in FIG. 2A) of the final cost with respect to each of (i) the learnable/trainable model parameters employed by key generator 102, and (ii) the learnable/trainable model parameters employed by audio synthesizer 104. The cost gradient with respect to any particular model parameter further drives an update of that model parameter (e.g., weights of the model) to minimize the relevant cost during the joint training process.

In a first example, cost optimizer CO may estimate a mean-squared error (MSE) or absolute error between the pre-processed target signal and the model output signal as the signal transformation cost. In a second example, assuming the target signal and the model output signal may be in the time domain, the spectral domain, or in the key parameter domain, cost optimizer CO may compute a weighted combination of multiple errors estimated in the time-domain, spectral domain, and key parameter domain as the signal transformation cost. Any known or hereafter developed back propagation technique may be used to train the two models, based on the training examples and parameters described herein. An example of computing key constraint cost KCC is described below in connection with FIG. 2B.

Operations 202-210 repeat for successive input and corresponding target signal frames to train key generator 102 to generate key parameters KPT that configure audio synthesizer 104 to perform the signal transformation on the input signal such that the output signal characteristic of the output signal matches the target signal characteristic targeted by the signal transformation. The first training process jointly trains key generator 102 and audio synthesizer 104 at the same time on a frame-by-frame basis and using the back propagation to minimize the total cost across the two ML models. Once key generator 102 and audio synthesizer 104 have been trained jointly over many frames of the input signal and the target signal, the trained key generator and the trained audio synthesizer may be deployed for inference-stage processing of an (inference-stage) input signal based on (inference-stage) key parameters. Further examples of inference-stage processing are described below in connection with FIGS. 4-7.

Figure 2B:
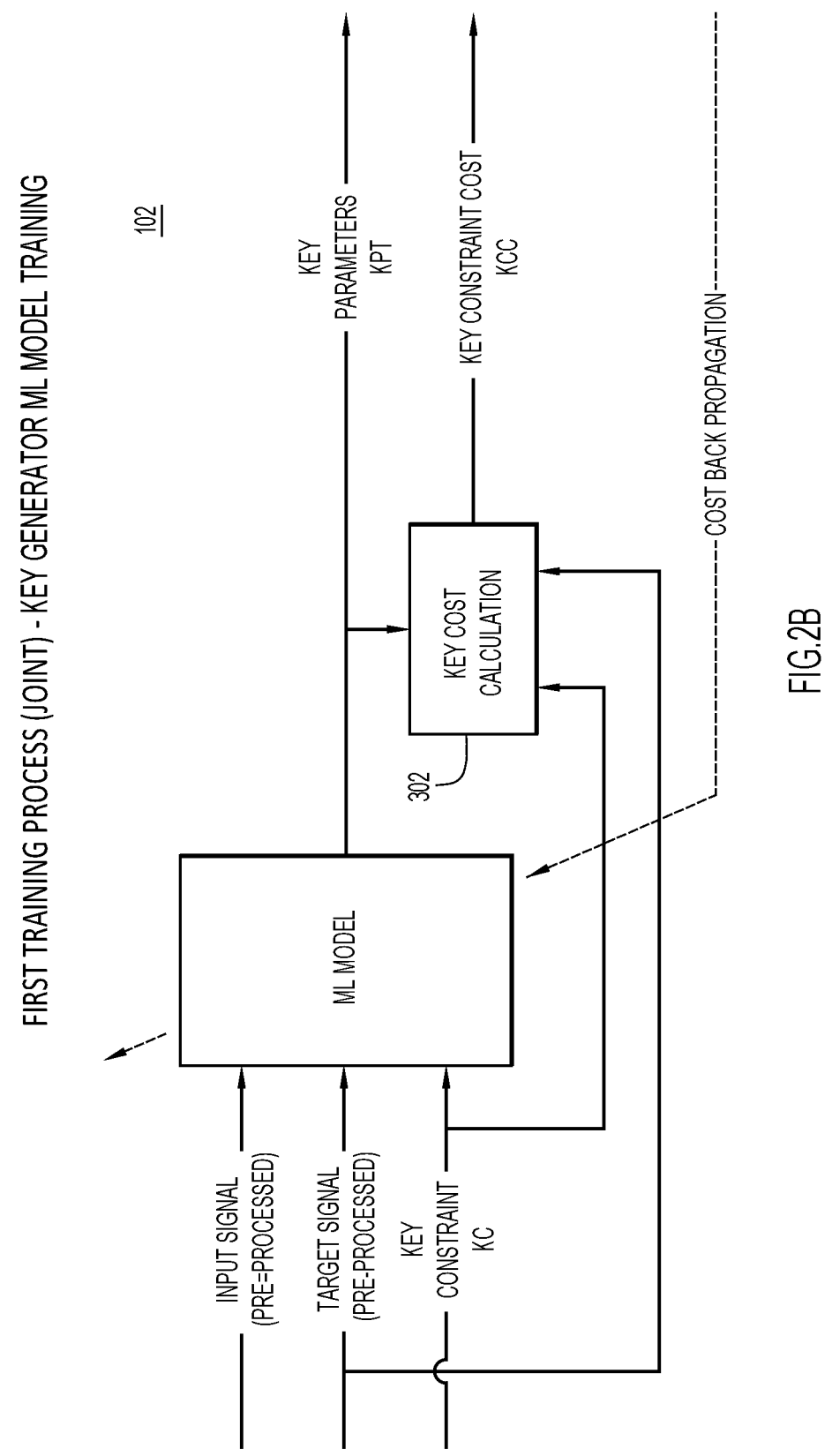
FIG. 2B is a flow diagram expanding on an example key generator ML model training operation of the first training process.

With reference to FIG. 2B, there is a flow diagram expanding on training operation 210 of the first training process, specifically with respect to computing key constraint cost KCC. For purposes of training, key generator 102 includes a key cost calculator 302 to compute key constraint cost KCC based on key parameters KPT, key constraints KC, and the pre-processed target signal. In an embodiment assuming key parameters configured as vectors, a key constraint cost implementation may be a measurement of orthogonality between the key parameter vectors. In particular, assuming each key parameter vector $K_m$ includes a collection of specific key parameters over all $N_b$ data points of a batch of training data points (e.g., audio files), then $$K_m = \begin{bmatrix} k_{1,m} \\ \vdots \\ k_{N_b,m} \end{bmatrix}, \text{ for } m = 1, \dots N_k,$$

where $K_m$ is the $m^{th}$ key parameter vector and $N_k$ is the number of key parameters to be used for conditioning the audio synthesizer 104.

A normalized key parameter vector is defined as $$\overline{K_m} = \begin{bmatrix} \overline{k_{1,m}} \\ \vdots \\ \overline{k_{N_b,m}} \end{bmatrix} = \frac{K_m}{\|K_m\|} = \frac{K_m}{\sqrt{\sum_{n=1}^{N_b} k_{n,m}^2}}.$$

All of the $N_k$ normalized parameter vectors, when collected together, constitute a normalized key parameter data matrix X, i.e., $$X = \begin{bmatrix} \overline{K_1} & \dots & \overline{K_{N_k}} \end{bmatrix} = \begin{bmatrix} \overline{k_{1,1}} & \dots & \overline{k_{1,N_k}} \\ \vdots & & \vdots \\ \overline{k_{N_b,1}} & \dots & \overline{k_{N_b,N_k}} \end{bmatrix}.$$

The correlation matrix R is defined as $$R = \begin{bmatrix} r_{1,1} & \dots & r_{1,N_k} \\ \vdots & & \vdots \\ r_{N_k,1} & \dots & r_{N_k,N_k} \end{bmatrix} = X^T X,$$

where superscript T denotes a matrix transpose i.e., $$X^T = \begin{bmatrix} \overline{k_{1,1}} & \dots & \overline{k_{N_b,1}} \\ \vdots & & \vdots \\ \overline{k_{1,N_k}} & \dots & \overline{k_{N_b,N_k}} \end{bmatrix}.$$

If the key vectors are orthogonal to each other, the correlation matrix R would be an identity matrix. Hence, it is desirable for the key constraint cost to measure a deviation of R from the ideal identity matrix. The key constraint cost can then be expressed as a ratio of the Frobenius norms of the undesired off-diagonal elements of the correlation matrix to the desired diagonal elements of the correlation matrix R, i.e., $$\text{Key constraint cost} = \sqrt{\frac{\sum_{m=1}^{N_k} \sum_{\substack{n=1, \\ n \neq m}}^{N_k} r_{m,n}^2}{\sum_{n=1}^{N_k} r_{n,n}^2}} = \sqrt{\frac{\sum_{m=1}^{N_k} \sum_{\substack{n=1, \\ n \neq m}}^{N_k} r_{m,n}^2}{N_k}}$$

Note that by construction, $r_{n,n} = \sqrt{\overline{K_n}^T \overline{K_n}} = \|\overline{K_n}\| = 1$ for all n.

As mentioned above, key constraint cost KCC is combined with the audio synthesizer cost to produce the final cost, which drives the back propagation of the cost gradients.

Figure 3A:
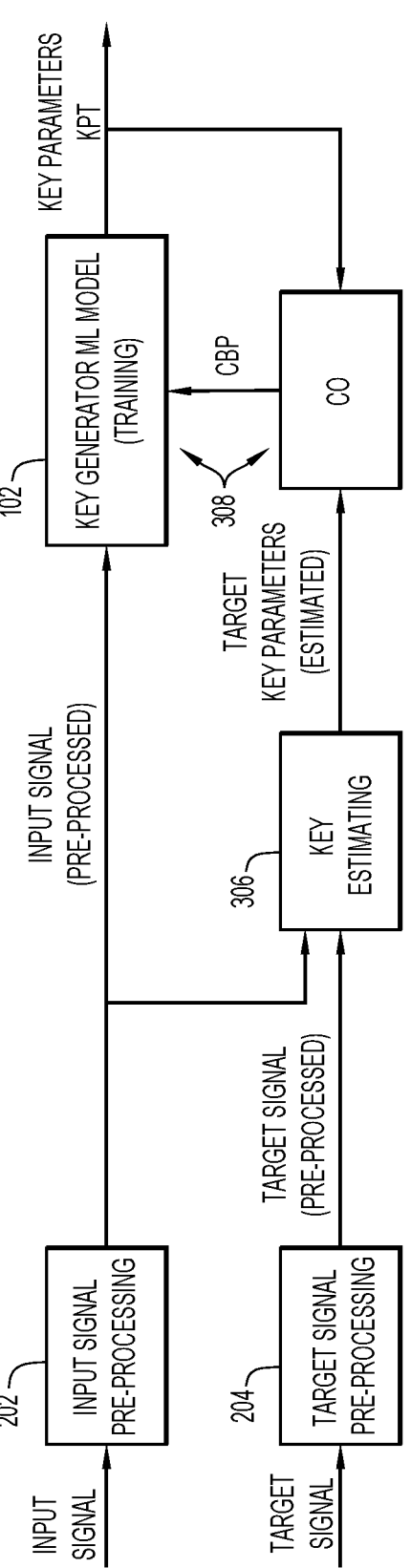
FIG. 3A is a flow diagram of an example first-stage of a second training process used to train the key generator ML model.

A second training process in now described in connection with FIGS. 3A and 3B. At a high-level, the second training process includes first and second independent sequential training stages that do not share their respective costs. The first-stage trains key generator 102. Then, the second-stage trains audio synthesizer 104 using trained key generator 102 from the first-stage. FIG. 3A is a flow diagram of the first-stage used to train key generator 102. Input signal pre-processing operation 202 produces a pre-processed input signal as described above. Target signal pre-processing operation 204 produces a pre-processed target signal as described above. Key estimating operation 306 uses one or more predetermined signal processing algorithms (not an ML process) to estimate target key parameters that serve as target/reference key parameters for training key generator 102, i.e., the key estimating derives the target key parameters algorithmically. Examples of target key parameters include a line spectral frequency (LSF) key, a harmonic key, and a temporal envelope key, as described below. At 308, key generator 102 is trained on the pre-processed input signal, without access to the target signal, such that the key generator learns to generate key parameters KPT that approximate the target key parameters. To do this, cost optimizer CO computes an error between the target key parameters and the key parameters KPT, and uses the error to drive cost back propagation (CBP) to update the learnable parameters of key generator 102 used to generate the key parameters KPT, and thereby minimize the error. In an example, cost optimizer CO computes an MSE or absolute error between the target key parameters and key parameters KPT.

To estimate the target key parameters, key estimating operation 306 (also referred to as key estimator 306) may perform a variety of different analysis operations on the input signal and/or the target signal, to produce corresponding different sets of target key parameters. In one example, key estimating operation 306 performs linear prediction (LP) analysis of at least one of the target signal, the input signal, or an intermediate signal generated based on the target and input signals. The LP analysis produces LP coefficients (LPCs) and LSFs that, in general, compactly represent a broader spectral envelope of the underlying signal, i.e., the target signal, the input signal, or an intermediate signal. The LSFs compactly represent the LPCs where they exhibit good quantization and frame-to-frame interpolation properties.

The LSFs of the target signal (i.e., which represents a reference or ground truth) serve as a good representation for audio synthesizer 104 to learn or mimic the spectral envelope of the target signal (i.e., the target spectral envelope) and impose a spectral transformation on the spectral envelope of the input signal (i.e., the input spectral envelope) to produce a transformed signal (i.e., the output signal) that has that target spectral envelope. Thus, in this case, the target key parameters represent or form the basis for a "spectral envelope key" that includes spectral envelope key parameters. The spectral envelope key configures audio synthesizer 104 to transform the input signal to the output signal, such that the spectral envelope of the output signal (i.e., the output spectral envelope) matches or follows the target spectral envelope.

In another example, key estimating operation 306 performs frequency harmonic analysis of at least one of the target signal, the input signal, or an intermediate signal generated based on the target and input signals. The harmonic analysis generates as the target key parameters a representation of a subset of dominant tonal harmonics that are, e.g., present in the target signal as target harmonics and are either in or missing from the input signal. Key estimating operation 306 estimates the dominant tonal harmonics using, e.g., a search on spectral peaks, or a sinusoidal analysis/synthesis algorithm. In this case, the target key parameters represent or form the basis of a "harmonic key" comprising harmonic key parameters. The harmonic key configures audio synthesizer 104 to transform the input signal to the output signal, such that the output signal includes the spectral features that are present in the target signal, but absent from the input signal. In this case, the signal transformation may represent a signal enhancement of the input signal to produce the output signal with perceptually-improved signal quality, which may include frequency bandwidth extension (BWE), for example. The above-described LP analysis that produces LSFs and harmonic analysis are each examples of spectral analysis.

In yet another example, key estimating operation 306 performs temporal analysis (i.e., time-domain analysis) of at least one of the target signal, or an intermediate signal generated based on the target and input signals. The temporal analysis produces target key parameters as parameters that compactly represent temporal evolution in a given frame (e.g., gain variations), or a broad temporal envelope of either the target signal or the intermediate signal (generally referred to as "temporal amplitude" characteristics), for example. In both bandlimited and distorted cases, the temporal features of the target signal (i.e., the reference or ground truth) serve as a good prototype for audio synthesizer 104 to learn or mimic the temporal fine structure of the target signal (i.e., the desired temporal fine structure) and impose this temporal feature transformation on the input signal. In this case, the target key parameters represent or form the basis for a "temporal key" comprising temporal key parameters. The temporal key configures audio synthesizer 104 to transform the input signal to the output signal such that the output signal has the desired temporal envelope.

Figure 3B:
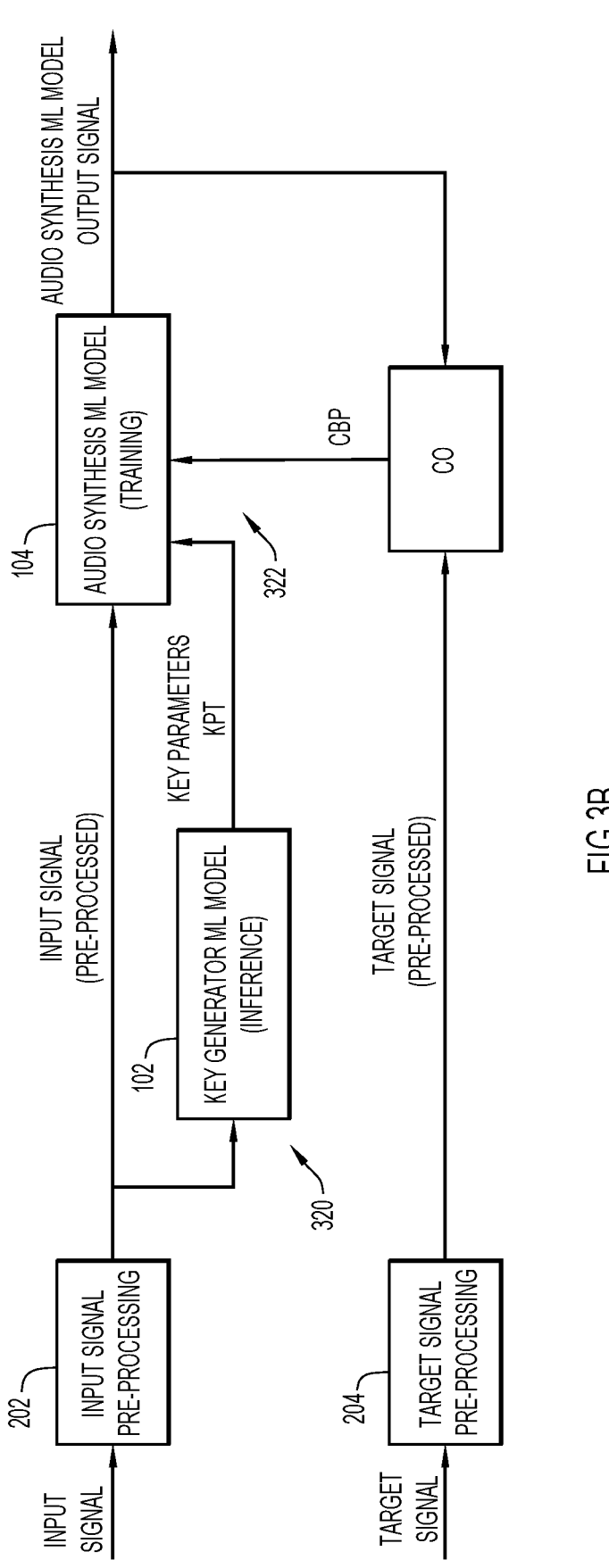
FIG. 3B is a flow diagram of an example second-stage of the second training process used to train the audio synthesis ML model based on the trained key generator ML model from the first-stage.

FIG. 3B is a flow diagram of the second-stage of the second training process. The second-stage follows the first-stage and uses trained key generator 102 to train audio synthesizer 104. In the second-stage, input signal pre-processing 202 provides the pre-processed input signal to trained key generator 102 and initially untrained audio synthesizer 104. Target signal pre-processing 204 provides the pre-processed target signal to cost optimizer CO. At 320, key generator 102 operates in inference mode to generate key parameters KPT that approximate the target key parameters described above, responsive to the pre-processed input signal. At 322, key parameters KPT configure audio synthesizer 104 to perform a signal transformation on the pre-processed input signal, to produce an output signal. Cost optimizer CO computes an error between the output signal and the pre-processed target signal, and uses the error to drive cost back propagation to the trainable parameters of audio synthesizer 104, and thereby minimize the error. In an example, cost optimizer CO computes an MSE or absolute error between the pre-processed target signal and the output signal.

Figure 4:
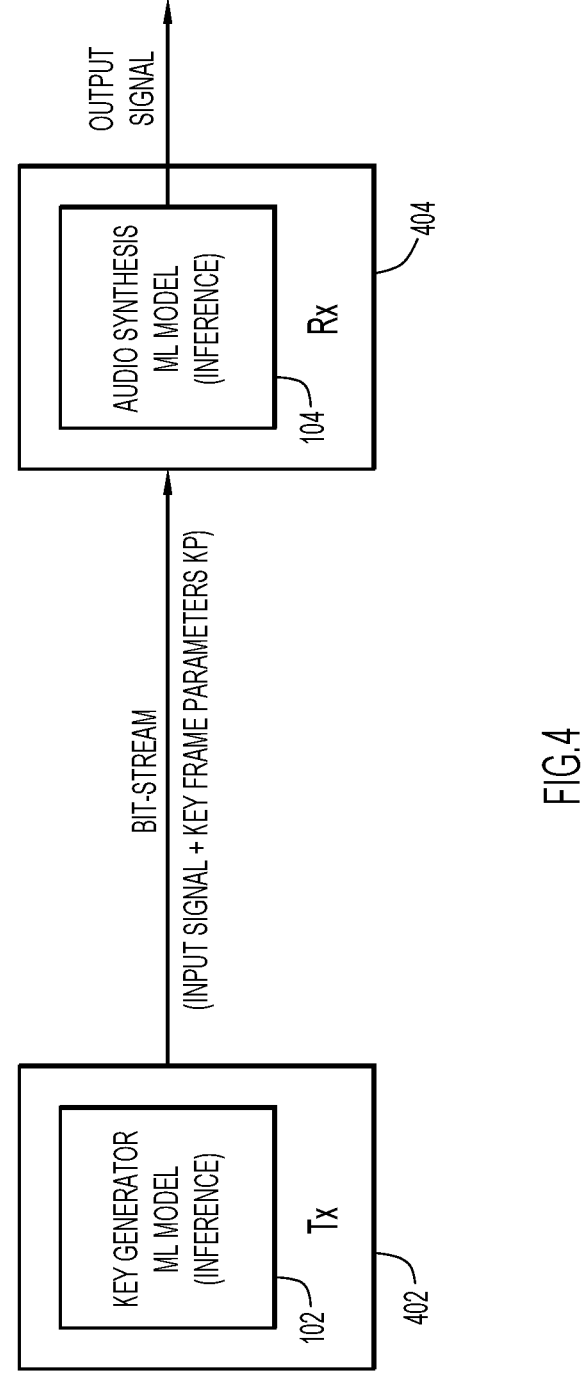
FIG. 4 is a block diagram of an example high-level communication system in which the key generator ML model and the audio synthesis ML model, once trained using the first training process, may be deployed to perform inference-stage key-guided signal transformations.

With reference to FIG. 4, there is a block diagram of an example high-level communication system 400 in which key generator 102 and audio synthesizer 104, once trained according to the first training process, for example, may be deployed to perform inference-stage processing. Communication system 400 includes a transmitter (TX) 402, in which key generator 102 may be deployed, and a receiver (RX) 404, in which audio synthesizer 104 may be deployed. Key generator 102 of transmitter 402 generates key parameters KP (referred to as "key frame parameters" in FIG. 4 to indicate their frame-by-frame generation during inference) based on in an input signal and a target signal. Transmitter 402 combines the key parameters and the input signal into a bit-stream and transmits the bit-stream to receiver 404 over a communication channel. Receiver 404 receives the bit-stream from the communication channel, and recovers the input signal and the key parameters from the bit-stream. Audio synthesizer 104 transforms the input signal recovered from the bit-stream based on key parameters recovered from the bit-stream, to produce an output signal. Inference-stage processing performed in transmitter 402 and receiver 404 are described below in connection with FIG. 5 and FIGS. 6 and 7.

Figure 5:
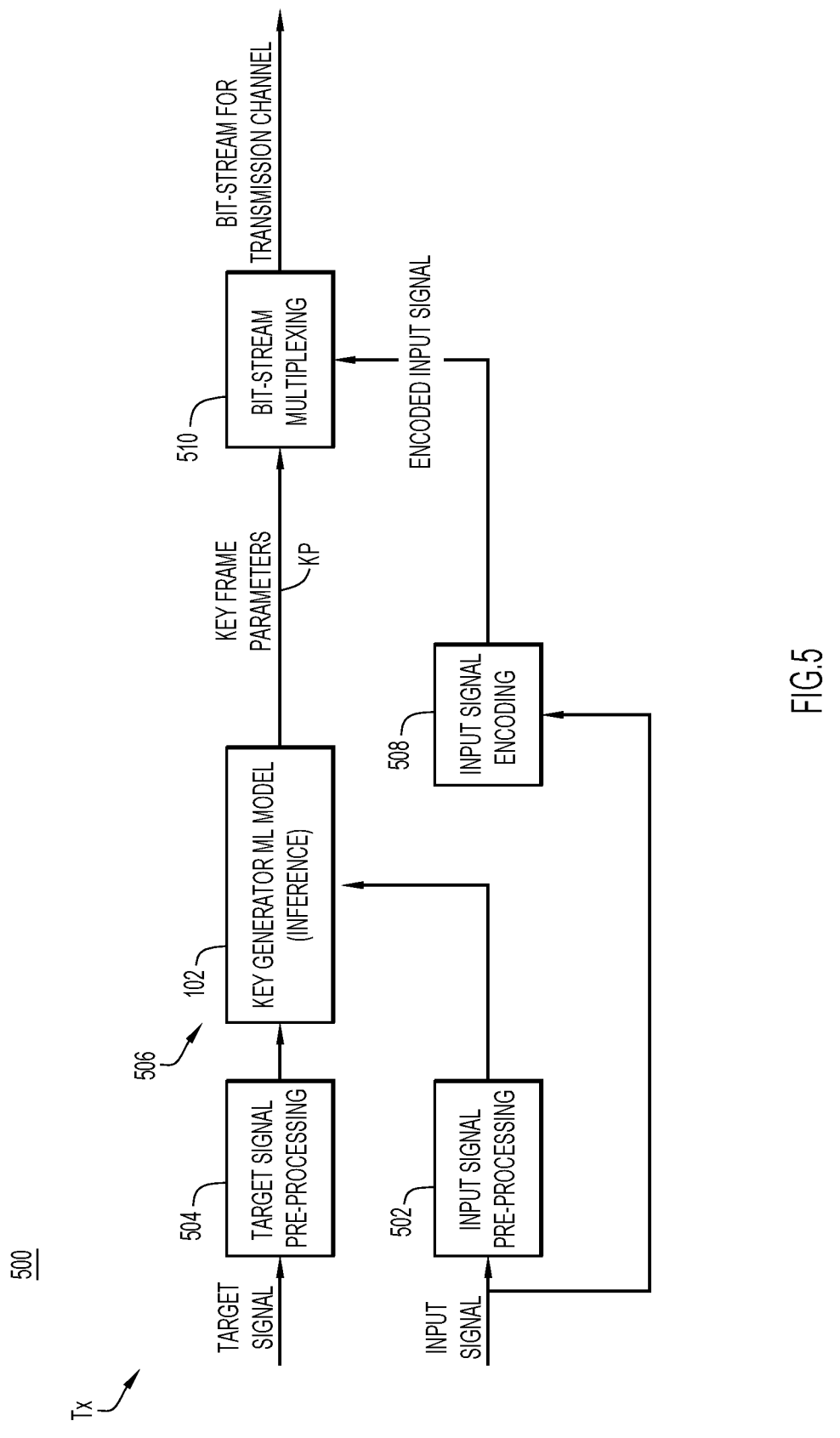
FIG. 5 is a flow diagram of an example inference-stage transmitter process, performed in a transmitter of the communication system.

With reference to FIG. 5, there is a flow diagram of an example inference-stage transmitter process 500 performed by transmitter 402 to produce a bit-stream for transmission to receiver 404. Transmitter process 500 operates on a full set of signals, e.g., input signal, target signal, and key parameters KP, that have similar statistical characteristics as the corresponding training signals of training process 200.

At 502, the process pre-processes an input signal frame to produce a pre-processed input signal frame, and provides the pre-processed signal frame to key generator 102. Similarly, at 504, the process pre-process a target signal frame to produce a pre-processed target signal frame, and provides the pre-processed target signal frame to key generator 102. Pre-processing operations 502 and 504 may include operations similar to respective pre-processing operations 202 and 204 described above, for example.

At 506, key generator 102, pre-trained according to the first training process, generates key parameters KP (i.e., "key frame parameters") corresponding to the input signal frame based on the pre-processed input and target signal frames. At 508, the process encodes the input signal frame to produce an encoded/compressed input signal frame (e.g., encoded input signal frame parameters). Encoding operation 508 may encode the input signal frame using any known or hereafter developed waveform preserving audio compression technique. At 510, a bit-stream multiplexing operation multiplexes the encoded input signal frame and the key parameters for the input signal frame into the bit-stream (i.e., a multiplexed signal) for transmission by transmitter 402 over the communication channel.

Figure 6:
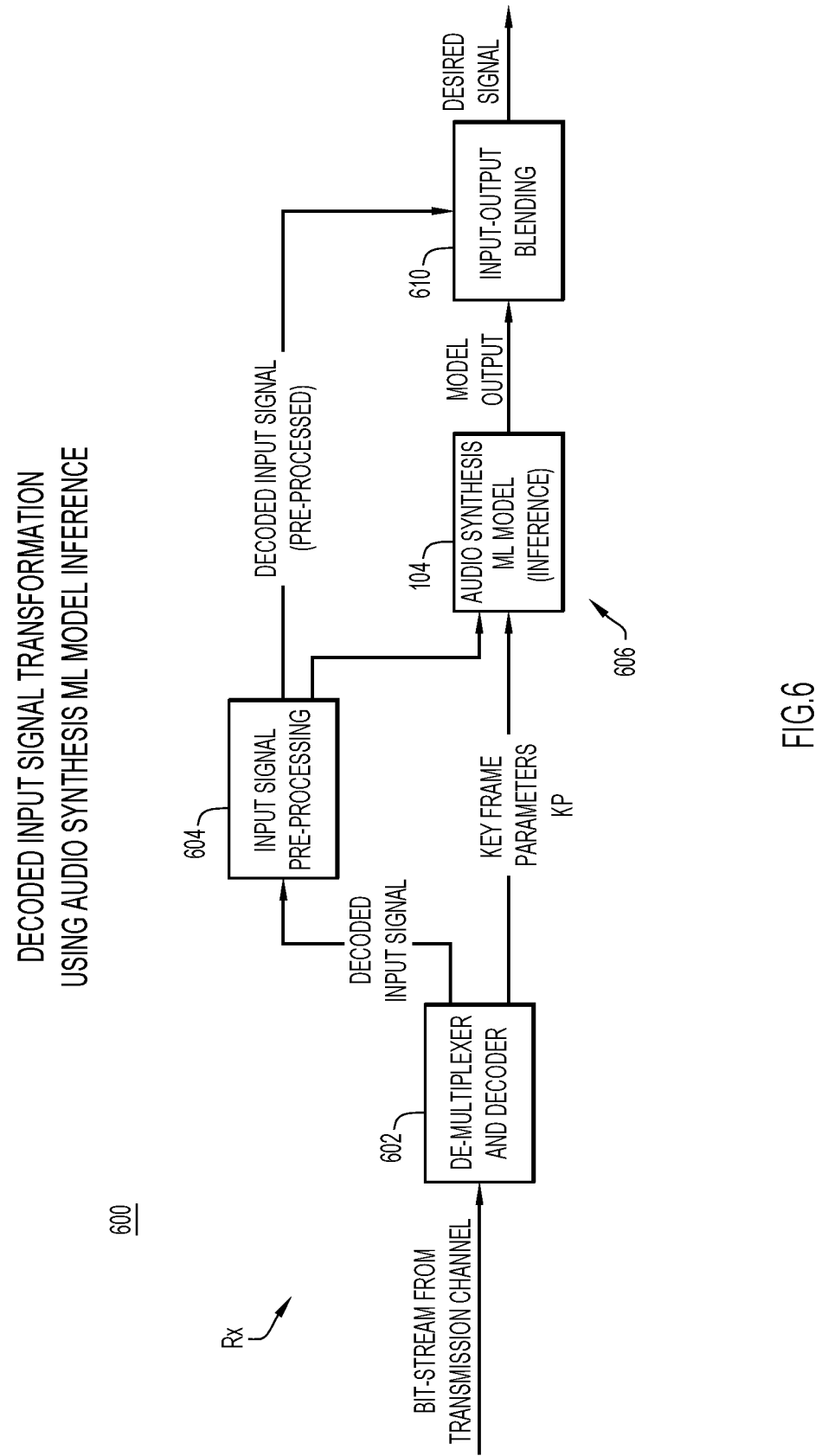
FIG. 6 is a flow diagram of an example inference-stage receiver process performed in a receiver of the communication system.

With reference to FIG. 6, there is a flow diagram of an example inference-stage receiver process 600 performed by receiver 404. Operations of receiver process 600 perform their respective functions on a frame-by-frame basis, similar to the operations of transmitter process 500. Receiver process 600 receives the bit-stream transmitted by transmitter 402. Receiver process 600 includes a demultiplexer-decoder operation 602 (also referred to simply as a "decoder" operation) to demultiplex the encoded input signal and the key parameters from the bit-stream, and to decode the encoded input signal to recover local copies/versions of the input signal (referred to as the "decoded input signal" in FIG. 6) and the key parameters for the current frame.

Next, an optional input signal pre-processing operation 604 pre-processes the input signal from bit-stream demultiplexer-decoder operation 602, to produce a pre-processed version of the input signal that is representative of the input signal. Based on the key parameters, at 606, audio synthesizer 104, pre-trained according to the first training process, performs a desired signal transformation on the pre-processed version of the input signal, to produce an output signal (labeled "model output" in FIG. 6). In an embodiment that omits input signal pre-processing operation 604, audio synthesizer 104 performs the desired signal transformation on the input signal, directly. The pre-processed version of the input signal and the input signal may each be referred to more generically as "a signal that is representative of the input signal."

Receiver process 600 may also include an input-output blending operation 610 to blend the pre-processed input signal with the output signal, to produce a desired signal.

Input-output blending operation 610 may include one or more of the following operations performed on a frame-by-frame basis:

a. A constant-overlap-add (COLA) windowing, for example, with 50% hop and overlap-add of two consecutive windowed frames.

b. Blending of windowed/filtered versions of the output signal and the pre-processed input signal to generate the desired signal, the goal of the blending being to control characteristics of the desired signal in a region of spectral overlap between the output signal and the pre-processed input signal. Blending may also include post-processing of the output signal based on the key parameters to control the overall tonality and noisiness in the output signal.

In summary, process 600 includes (i) receiving input audio and key parameters representative of a target audio characteristic, and (ii) configuring audio synthesizer 104, that was previously trained to be configured by the key parameters, with the key parameters to cause the audio synthesizer to perform a signal transformation of audio representative of the input audio (e.g., either the input audio or a pre-processed version of the input audio), to produce output audio with an output audio characteristic that matches the target audio characteristic. The key parameters may represent a target spectral characteristic as the target audio characteristic, and the configuring includes configuring audio synthesizer 104 with the key parameters to cause the audio synthesizer to perform the signal transformation of an input spectral characteristic of the input audio to an output spectral characteristics of the output audio that matches the target spectral characteristic.

Figure 7:
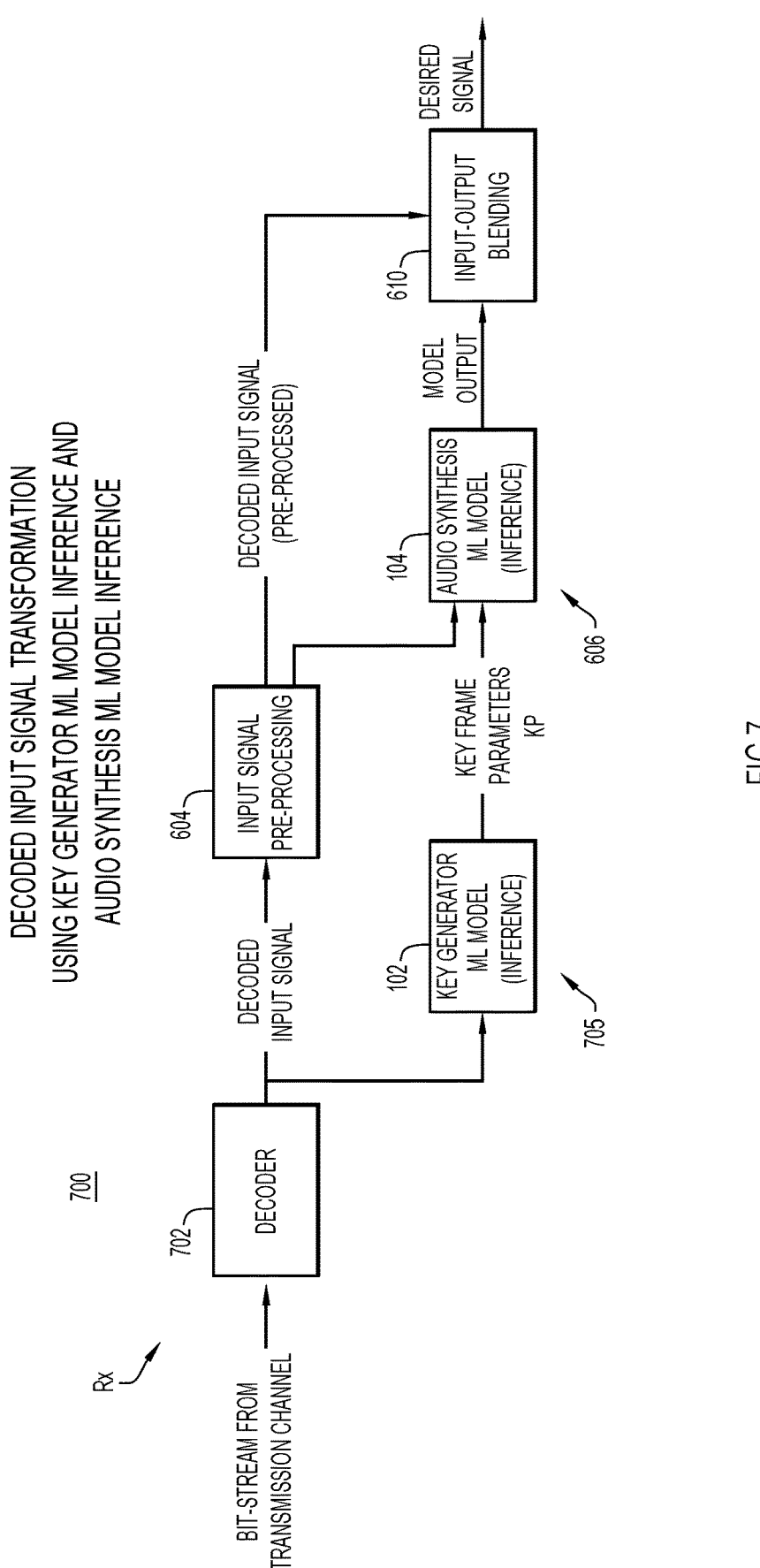
FIG. 7 is a flow diagram of an example inference-stage receiver process performed in a receiver that includes the key generator ML model and the audio synthesis model, once trained using the second training process.

With reference to FIG. 7, there is a flow diagram of an example inference-stage receive/decode process 700 performed by a receiver that includes both key generator 102 and audio synthesizer 104 each trained according to the second training process, i.e., using the second key cost implementation. Process 700 employs some, but not all, of the operations of process 600. Process 700 receives a bit-stream including an encoded input signal, but no key parameters. Decoding operation 702 decodes the encoded input signal in the bit-stream to recover a local copy of the input signal, i.e., a decoded input signal. Optional input signal pre-processing operation 604 pre-processes the input signal, to produce a pre-processed version of the input signal that is representative of the input signal. At 705, key generator 102 generates key parameters locally based on the input signal. At 606, trained audio synthesizer 104 performs a desired signal transformation on the pre-processed version of the input signal (or the input signal) based on the key parameters, to produce an output signal. Input-output blending operation 610 blends the pre-processed input signal with the output signal, to produce a desired signal. Thus, receive/decode process 700 synthesizes key parameters locally (i.e., at the receiver/decoder) during inference, instead of generating the key parameters at the transmitter/encoder and transmitting them in a bit-stream as is done in transmitter process 500.

With reference to FIG. 8, there is a flowchart of an example method 800 of performing a key-guided signal transformation during inference-stage processing using key generator 102 (referred to as a "first neural network") and audio synthesizer 104 (referred to as a "second neural network").

At 802, one or more of input audio and target audio having a target audio characteristic are received. The input audio and target audio may each include a sequence of audio frames.

At 804, using a first neural network, trained to generate key parameters that satisfy one or more predetermined key constraints and that represent the target audio characteristic based on one or more of the target audio and the input audio, key parameters are generated. The first neural network may generate the key parameters on a frame-by-frame basis to produce a sequence of frame-by-frame key parameters. The key constraints represents or are indicative of key cost, e.g., (1) mutual orthogonality of key vectors when the key parameters are generated from the target audio in the first training process, or (2) MSE match of the algorithmically estimated key parameters (e.g., the LSF key) when the key parameters are generated from the input audio in the second training process.

At 806, a second neural network, trained to be configured by the key parameters, is configured by/with the key parameters to cause the second neural network to perform a signal transformation of the input audio, to produce output audio having an output audio characteristic corresponding to and that matches the target audio characteristic. That is, the signal transformation transforms the input audio characteristic to the output audio characteristic that matches or is similar to the target audio characteristic. The second neural network may be configured by the sequence of frame-by-frame key parameters on a frame-by-frame basis to transform each input audio frame to a corresponding output audio frame, to produce the output audio as a sequence of output audio frames (one output audio frame per one input audio frame and per set of frame-by-frame key parameter).

Previous to operations 802-806, the first and second neural networks are trained using any of various training processes. For example, a first training process jointly trains the first neural network and the second neural network to perform the key generation and the signal transformation, respectively, to minimize a combined cost, derived based on a first cost associated with the key parameters and a second cost associated with the signal transformation. The combined cost is configured to drive back propagation of cost gradients of the combined cost with respect to each of the first neural network and the second neural network. The first cost measures mutual orthogonality between vectors representative of the key parameters, and the second cost measures an error between training target audio and training output audio produced by the signal transformation.

In another example, a second training process includes sequential independent first and second-stages. The first-stage trains the first neural network to minimize a first cost associated with the key parameters. That is, the first neural network is trained to generate the key parameters to approximate target key parameters derived algorithmically from the target signal, such that the key parameters minimize error (i.e. the first cost) between the key parameters and the target key parameters. Then, the second-stage trains the second neural network using the trained first neural network to minimize a second cost (independent of the first cost) associated with the signal transformation.

Figure 9:
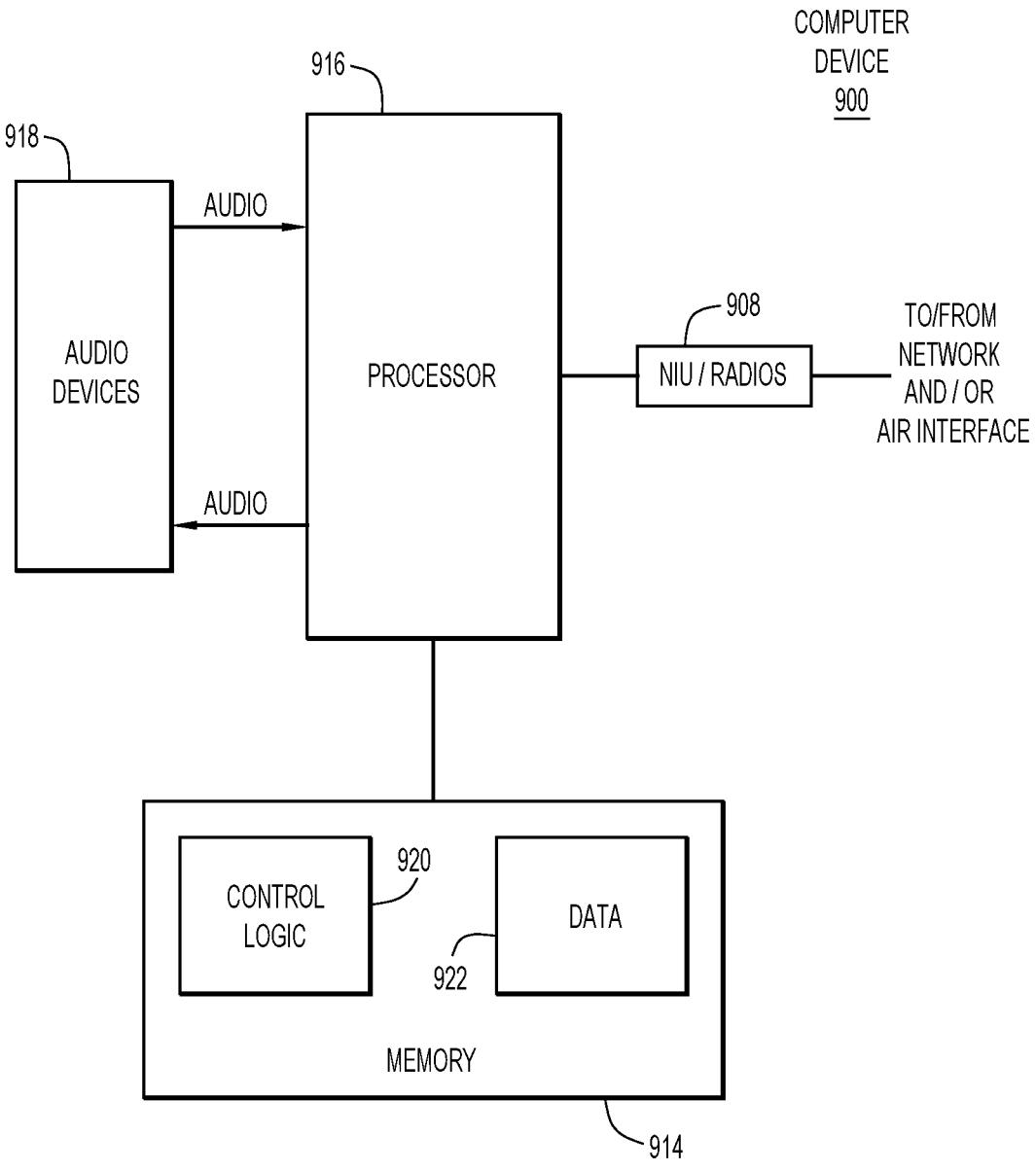
FIG. 9 is a block diagram of an example computer device configured to implement embodiments presented herein.

With reference to FIG. 9, there is a block diagram of a computer device 900 configured to implement embodiments presented herein. There are numerous possible configurations for computer device 900 and FIG. 9 is meant to be an example. Examples of computer device 900 include a tablet computer, a personal computer, a laptop computer, a mobile phone, such as a smartphone, and so on. Also, computer device 900 may be incorporated into a transmitter or receiver as described herein, such as in an HD radio transmitter or receiver. Computer device 900 includes one or more network interface units (NIUs)/Radios 908, and memory 914 each coupled to a processor 916. The one or more NIUs/Radios 908 may include wired and/or wireless connection capability that allows processor 916 to communicate over a communication network. For example, NIUs/Radios 908 may include an Ethernet card to communicate over an Ethernet connection, a wireless RF transceiver to communicate wirelessly with cellular networks in the communication network, a radio configured to transmit and receive RF signals (e.g., for HD radio) over an air interface (I/F), optical transceivers, and the like, as would be appreciated by one of ordinary skill in the relevant arts. Processor 916 receives sampled or digitized audio, and provides digitized audio to, one or more audio devices 918, as is known. Audio devices 918 may include microphones, loudspeakers, analog-to-digital converters (ADCs), and digital-to-analog converters (DACs).

Processor 916 may include a collection of microcontrollers and/or microprocessors, for example, each configured to execute respective software instructions stored in the memory 914. Processor 916 may host/implement one or more ML models, including one or more of key generator ML model 102 and audio synthesis ML model 104. Processor 916 may be implemented in one or more programmable application specific integrated circuits (ASICs), firmware, or a combination thereof. Portions of memory 914 (and the instructions therein) may be integrated with processor 916. As used herein, the terms "acoustic," "audio," and "sound" are synonymous and interchangeable.

The memory 914 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 914 may comprise one or more computer readable storage media (e.g., a memory device) encoded with software comprising computer executable instructions and when the software is executed (by the processor 916) it is operable to perform the operations described herein. For example, the memory 914 stores or is encoded with instructions for control logic 920 to implement modules configured to perform operations described herein related to one or both of the ML models, training of the ML models, operation of the ML models during inference, input/target signal pre-processing, input/target signal encoding and decoding, cost computation, cost minimization, back propagation, bit-stream multiplexing and demultiplexing, input-output blending (post-processing), and the methods described above.

In addition, memory 914 stores data/information 922 used and generated by processor 916, including key parameters, input audio, target audio, and output audio, and coefficients and weights employed by the ML models, and so on.

In summary, in one embodiment, a method is provided comprising: receiving input audio and target audio having a target audio characteristic; using a first neural network, trained to generate key parameters that represent the target audio characteristic based on one or more of the target audio and the input audio, generating the key parameters based on one or more of the target audio and the input audio; and configuring a second neural network, trained to be configured by the key parameters, with the key parameters to cause the second neural network to perform a signal transformation of audio representative of the input audio, to produce output audio having an output audio characteristic corresponding to and that matches the target audio characteristic.

In another embodiment, a system is provided comprising: a transmitter including a radio coupled to a processor and configured to: receive input audio and target audio having a target audio characteristic; use a first neural network, trained to generate key parameters that represent the target audio characteristic based on one or more of the target audio and the input audio, to generate the key parameters based on one or more of the target audio and the input audio; encode the input audio into encoded input audio; and transmit the key parameters and the encoded input audio; and a receiver including a radio coupled to a processor and configured to: receive the key parameters and the encoded input audio; decode the encoded input audio to recover the input audio; and configure a second neural network, trained to be configured by the key parameters, with the key parameters to cause the second neural network to perform a signal transformation of audio representative of the input audio, to produce output audio having an output audio characteristic corresponding to and that matches the target audio characteristic.

In another embodiment, a method is provided comprising: receiving a bit-stream including encoded input audio; decoding the encoded input audio to recover input audio; using a first neural network, trained to generate key parameters that represent target audio characteristic based on one or more of target audio and the input audio, generating the key parameters based on the input audio; and configuring a second neural network, trained to be configured by the key parameters, with the key parameters to cause the second neural network to perform a signal transformation of audio representative of the input audio, to produce output audio having an output audio characteristic corresponding to and that matches the target audio characteristic.

In yet another embodiment, a non-transitory computer readable medium/media is provided. The medium is encoded with instructions that, when executed by a processor, cause the processor perform: receiving input audio and target audio having a target audio characteristic; using a first neural network, trained to generate key parameters that represent the target audio characteristic based on one or more of the target audio and the input audio, generating the key parameters based on one or more of the target audio and the input audio; and configuring a second neural network, trained to be configured by the key parameters, with the key parameters to cause the second neural network to perform a signal transformation of audio representative of the input audio, to produce output audio having an output audio characteristic corresponding to and that matches the target audio characteristic.

In a further embodiment, a non-transitory computer readable medium/media is provided. The medium is encoded with instructions that, when executed by a processor, cause the processor perform: receiving a bit-stream including encoded input audio; decoding the encoded input audio to recover input audio; using a first neural network, trained to generate key parameters that represent target audio characteristic based on one or more of target audio and the input audio, generating the key parameters based on the input audio; and configuring a second neural network, trained to be configured by the key parameters, with the key parameters to cause the second neural network to perform a signal transformation of audio representative of the input audio, to produce output audio having an output audio characteristic corresponding to and that matches the target audio characteristic.

In another embodiment, an apparatus is provided comprising: a receiver including a radio coupled to a processor configured to executed instructions stored in memory to cause the processor to perform: receiving a bit-stream including encoded input audio; decoding the encoded input audio to recover input audio; using a first neural network, trained to generate key parameters that represent target audio characteristic based on one or more of target audio and the input audio, generating the key parameters based on the input audio; and configuring a second neural network, trained to be configured by the key parameters, with the key parameters to cause the second neural network to perform a signal transformation of audio representative of the input audio, to produce output audio having an output audio characteristic corresponding to and that matches the target audio characteristic.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:

receiving input audio and independent target audio having a target audio characteristic;

using a first neural network deployed at a radio transmitter, trained to generate key parameters that represent the target audio characteristic based on one or more of the target audio and the input audio, generating the key parameters based on one or more of the target audio and the input audio;

encoding the input audio into encoded input audio at the radio transmitter;

multiplexing the key parameters and the encoded input audio at the radio transmitter;

transmitting the multiplexed key parameters and the multiplexed encoded input audio from the radio transmitter;

receiving the multiplexed key parameters and the encoded input audio at a radio receiver;

demultiplexing the multiplexed key parameters and the multiplexed encoded input audio at the radio receiver;

decoding the demultiplexed encoded input audio to recover the input audio at the radio receiver; and configuring, at the radio receiver, a second neural network deployed at the radio receiver to perform a signal transformation of audio representative of the decoded input audio using the demultiplexed key parameters to produce output audio having an output audio characteristic that matches the target audio characteristic.

2. The method of claim 1, wherein:

the generating the key parameters with the first neural network includes generating the key parameters to represent the target audio characteristic of the target audio.

3. The method of claim 1, wherein:

the input audio and the target audio include respective sequences of audio frames;

the generating the key parameters includes generating the key parameters on a frame-by-frame basis; and the configuring the second neural network includes configuring the second neural network with key parameters generated on a frame-by-frame basis to cause the second neural network to perform the signal transformation on the frame-by-frame basis, to produce the output audio as a sequence of audio frames.

4. The method of claim 1, wherein:

the first neural network and the second neural network were trained jointly to minimize a combined cost, including a first cost associated with the key parameters and a second cost associated with the signal transformation.

5. The method of claim 4, wherein the combined cost is configured to drive back propagation of cost gradients of the combined cost with respect to each of the first neural network and the second neural network.

6. The method of claim 4, wherein:

the first cost measures mutual orthogonality between vectors representative of the key parameters; and the second cost represents an error between training target audio and training output audio produced by the signal transformation.

7. The method of claim 1, wherein receiving the input audio comprises: receiving a bit-stream including theencoded input audio; and decoding the encoded input audio to recover the input audio.

8. The method of claim 7, wherein:

the first neural network is trained to generate the key parameters to approximate target key parameters derived algorithmically from the target audio, such that the key parameters minimize an error between the key parameters and the target key parameters.

9. The method of claim 7, wherein:

the generating the key parameters using the first neural network includes generating the key parameters as spectral envelope key parameters including linear prediction (LP) coefficients (LPCs) or line spectral frequencies (LSFs) that represent a target spectral envelope of the target audio; and the configuring includes configuring the second neural network with the spectral envelope key parameters to cause the second neural network to perform the signal transformation as a transformation of an input spectral envelope of the input audio to an output spectral envelope of the output audio that matches the target spectral envelope.

10. The method of claim 7, wherein:

the generating the key parameters includes generating the key parameters as harmonic key parameters that represent target harmonics present in the target audio; and the configuring includes configuring the second neural network with the harmonic key parameters to cause the second neural network to perform the signal transformation of the audio representative of the input audio, such that the output audio includes harmonics that match the target harmonics.

11. The method of claim 7, wherein:

the generating the key parameters includes generating the key parameters as temporal key parameters that represent a target temporal characteristic of the target audio; and the configuring includes configuring the second neural network with the temporal key parameters to cause the second neural network to perform the signal transformation as a transformation of an input temporal characteristic of the input audio to an output temporal characteristic of the output audio that matches the target temporal characteristic.

12. A system comprising:

a transmitter including a radio coupled to a processor and configured to:

receive input audio and independent target audio having a target audio characteristic;

use a first neural network, trained to generate key parameters that represent the target audio characteristic based on one or more of the target audio and the input audio, to generate the key parameters based on one or more of the target audio and the input audio;

encode the input audio into encoded input audio; and multiplex the key parameters and the encoded input audio at the radio transmitter; and transmit the multiplexed key parameters and the multiplexed encoded input audio; and a receiver including a radio coupled to a processor and configured to:

receive the multiplexed key parameters and the encoded input audio;

demultiplex the multiplexed key parameters and the multiplexed encoded input audio;

decode the demultiplexed encoded input audio to recover the input audio; and configure a second neural network, to perform a signal transformation of audio representative of the decoded input audio using the demultiplexed key parameters to produce output audio having an output audio characteristic that matches the target audio characteristic.

13. The system of claim 12, wherein:

the first neural network is configured to generate the key parameters to represent a target characteristic of the target audio.

14. The system of claim 12, wherein:

the input audio and the target audio include respective sequences of audio frames;

the first neural network is configured to generate the key parameters by generating the key parameters on a frame-by-frame basis; and the receiver is configured to configure the second neural network by configuring the second neural network with key parameters generated on the frame-by-frame basis to cause the second neural network to perform the signal transformation on a frame-by-frame basis, to produce the output audio as a sequence of audio frames.

15. The system of claim 12, wherein:

the first neural network and the second neural network were trained jointly to minimize a combined cost, including a first cost associated with the key parameters and a second cost associated with the signal transformation.

16. The system of claim 15, wherein the combined cost is configured to drive back propagation of cost gradients of the combined cost with respect to trainable model parameters of each of the first neural network and the second neural network.

17. The system of claim 15, wherein:

the first cost measures mutual orthogonality between vectors representative of the key parameters; and the second cost measures an error between training target audio and training output audio produced by the signal transformation.

\* \* \* \* \*